United States Patent Office 3,309,180
Patented Mar. 14, 1967

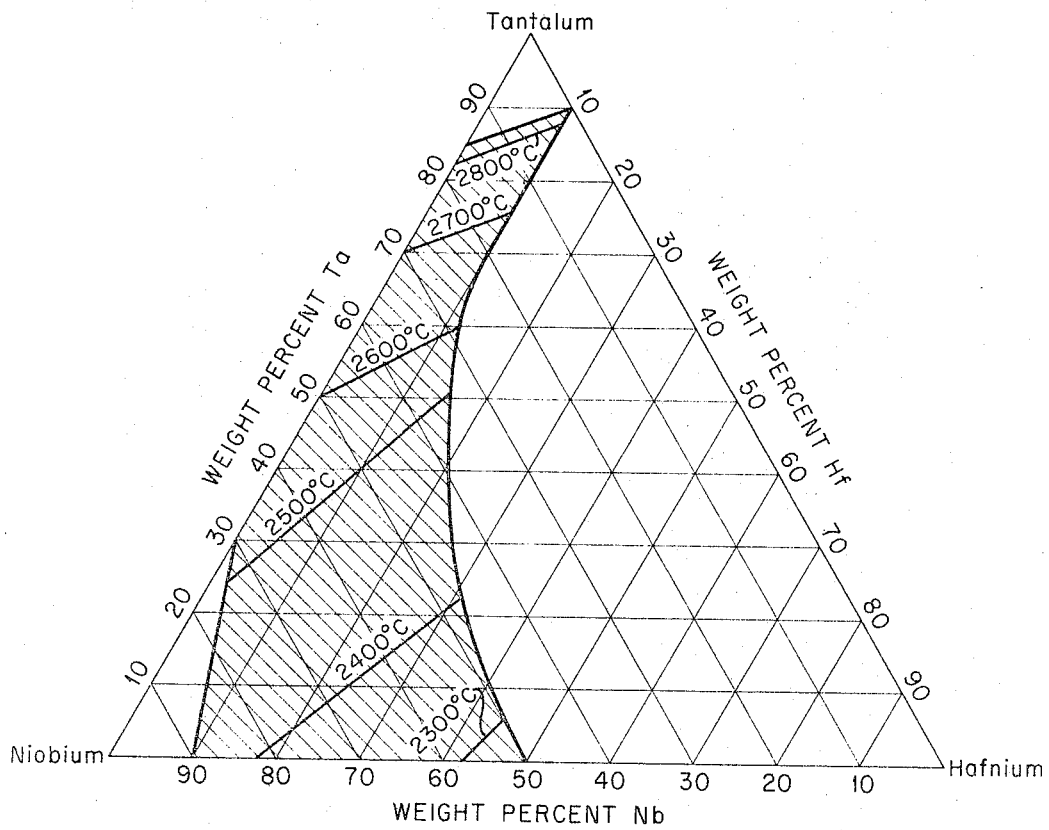

3,309,180
BRAZING ALLOYS FOR TANTALUM
Ronald H. Mueller and James C. Marshall, both of Cincinnati, Ohio, assignors to the United States of America as represented by the United States Atomic Energy Commission
Filed Feb. 28, 1964, Ser. No. 348,921
2 Claims. (Cl. 29—198)

Our invention relates to brazing alloys for refractory metals and more particularly to high-temperature brazing alloys for joining tantalum and tantalum alloys.

Tantalum and tantalum-base alloys, along with other refractory metals, are useful for numerous high-temperature applications in the nuclear energy and space fields. For example, these metals are used in high-temperature nuclear reactor fuel elements, in piping and heat exchangers and as structural materials.

One of the problems involved in the use of these metals is the provision of adequate joining methods. Most of the applications mentioned above require sealing or closure joints and/or structural joints for attachment to support hardware. Tantalum and tantalum-base alloys have been joined by welding and diffusion bonding as well as brazing, but numerous joint configurations and tolerances are encountered such that brazing is the only practical method. Satisfactory brazing alloys have been provided for relatively low and moderate temperatures, but not for brazing at high temperatures such as 2300° C. to 2800° C. Known alloy systems tend to erode tantalum at these temperatures or to exhibit poor flow characteristics due to vaporization of alloy constituents.

It is desired to provide a brazing alloy system which offers a choice of brazing temperatures in the range of 2300° C. to 2800° C. Other features desired for the alloy system are workability, good flow characteristics, compatibility with the base metal and the ability to increase the remelt temperature at the joint and thus allow service at high temperatures.

It is therefore an object of our invention to provide a method of joining tantalum and tantalum-base alloys.

Another object is to provide an alloy system for brazing tantalum and tantalum-base alloys at a temperature of 2300° C. to 2800° C.

Other objects and advantages of our invention will be apparent from the following detailed description and claims.

In accordance with our invention tantalum and tantalum-base alloys are joined brazing with an alloy of the composition 0 to 90 weight percent tantalum, 0 to 50 weight percent hafnium and the balance niobium, said brazing alloy composition being further limited to the shaded area of the ternary diagram in the accompanying figure. These alloys offer a choice of brazing temperatures in the range of about 2300° C. to 2800° C. Other favorable properties are good flow characteristics, excellent workability and compatibility with the base metal.

The accompanying figure is a ternary diagram of the niobium-tantalum-hafnium system, with the compositions included within the scope of our invention being represented by the shaded portion of the diagram. Lines of constant brazing temperature are indicated within the shaded portion, and compositions for a given temperature in the range of 2300° C. to 2800° C. may be selected by reference to these lines.

The remelt temperature of the joint is increased with higher amounts of tantalum, and the amount of tantalum which may be incorporated for a given brazing temperature is increased with increasing amounts of hafnium. Compositions within the shaded portion containing higher amounts of hafnium along with increased tantalum are accordingly selected where it is desired to obtain an increased remelt temperature without increasing the brazing temperature.

The hafnium content of this brazing alloy system is limited to the shaded portion of the diagram by a low-temperature miscibility gap and the resulting joint embrittlement which occurs at hafnium proportions higher than indicated by the shaded portion. Tantalum proportions higher than indicated are excluded because the alloy melting point too closely approaches the melting point of the base metal. At niobium proportions higher than indicated the alloy properties do not differ significantly from pure niobium.

The brazing alloys within the scope of our invention are highly workable and may be prepared in usable form, that is, sheet, powder or wire, by conventional fabrication techniques. For example, thin sheets may be prepared from cast alloy by working at room temperature.

Brazing with these alloys is effected by means of conventional techniques. The parts to be joined are positioned in abutting relationship with the brazing alloy disposed at the joint surface. The assembly is then heated to the brazing temperature for the particular composition. Exclusion of oxygen during heating is required, and a hydrogen or inert atmosphere may be employed. Complete flow of the brazing alloy at the joint surface is normally obtained by holding at temperature for about 5 minutes. Larger or thicker parts may require a longer heating period. The assembly is then cooled in the absence of oxygen.

The brazing alloy system and method described above are applicable to joining tantalum and alloys containing a predominant proportion, that is, over 70 weight percent thereof and having a melting point higher than the brazing alloy to themselves and to one another.

Our invention is further illustrated by the following specific example.

*Example*

A series of brazing tests was conducted using alloys in the system described above. In each test a sheet of brazing alloy was placed adjacent the joint line of a tantalum T section. The T section assembly was then heated in a resistance furnace to 1650° C. in helium. The helium was purged out with hydrogen at this temperature and the T section was heated to a predetermined temperature, held for five minutes, and cooled to 1650° C. in the hydrogen atmosphere. At this time the hydrogen was purged by helium and cooling was continued to room temperature. A heating rate of 100° F. per minute was normally maintained. The T sections were examined visually for extent of melting and flow and metallographically for fillet porosity, cracking and erosion. These tests were repeated in 25–50° C. intervals until the brazing temperature was determined.

The brazing temperature for the various alloy compositions may be seen by reference to the following table.

TABLE

| Composition, wt. percent: | Brazing temperature ° C. |
|---|---|
| Ta–70Nb | 2575 |
| Ta–50Nb | 2600 |
| Ta–30Nb | 2725 |
| Ta–15Nb–5Hf | 2775 |
| Ta–15Nb–10Hf | 2700 |
| Ta–30Nb–10Hf | 2625 |
| Ta–50Nb–10Hf | 2500 |
| Ta–70Nb–10Hf | 2475 |
| Ta–10Hf | 2825 |
| Nb–30Hf | 2375 |
| Nb–50Hf | 2275 |

The resulting joints exhibited small, even fillets with no apparent porosity or erosion of the base metal. All of these alloy compositions had excellent cold workabilty, being reduced from the cast state to sheet 0.025 centimeter thick at room temperature without intermediate anneal.

The above example is merely illustrative and is not to be understood as limiting the scope of our invention, which is limited only as indicated by the appended claims.

Having thus described our invention, we claim:

1. A composite body comprising at least two members selected from the group consisting of tantalum and alloys containing a predominant portion of tantalum joined to one another by a brazing alloy falling within the shaded area of the ternary diagram of the accompanying drawing, the joint formed from said members and said brazing alloy being characterized in having a remelt temperature higher than the melting temperature of the selected brazing alloy.

2. The method of joining tantalum and alloys containing a predominant proportion thereof to themselves and to one another which comprises disposing surfaces of the parts to be joined in abutting relationship with a brazing alloy disposed adjacent said abutting surface, the composition of said brazing alloy falling within the shaded area of the ternary diagram in the accompanying figure, heating the resulting assembly to a brazing temperature in the range of about 2300° C. to 2800° C. under non-oxidizing conditions and cooling the resulting brazed joint.

References Cited by the Examiner

UNITED STATES PATENTS

| | | | |
|---|---|---|---|
| 3,111,406 | 11/1963 | Kaarlela | 75—175.5 |
| 3,140,943 | 7/1964 | Field et al. | 75—174 |
| 3,220,828 | 11/1965 | Kaarlela | 75—175.5 |
| 3,249,429 | 5/1966 | Armantrout et al. | 75—174 |

OTHER REFERENCES

Hansen; Constitution of Binary Alloys, McGraw-Hill Company, New York, 1958, relied on pp. 813 and 1018.

WADD Technical Report 59–13, "Investigation of the Properties of Tantalum and Its Alloys," March 1960, pp. 133 and 140.

HYLAND BIZOT, *Primary Examiner.*

DAVID L. RECK, *Examiner.*

C. N. LOVELL, *Assistant Examiner.*